United States Patent
Fenske et al.

(10) Patent No.: US 10,368,412 B2
(45) Date of Patent: Jul. 30, 2019

(54) LED DRIVER

(71) Applicant: TEXAS INSTRUMENTS INCORPORATED, Dallas, TX (US)

(72) Inventors: John Peter Fenske, Richardson, TX (US); Muhammad Roshanali Rajabali, Plano, TX (US); Jeffrey Scott Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/859,081

(22) Filed: Dec. 29, 2017

(65) Prior Publication Data

US 2019/0208595 A1   Jul. 4, 2019

(51) Int. Cl.
*H05B 33/08* (2006.01)
*H04N 9/31* (2006.01)

(52) U.S. Cl.
CPC ......... *H05B 33/0851* (2013.01); *H04N 9/312* (2013.01); *H04N 9/3155* (2013.01)

(58) Field of Classification Search
CPC .... H05B 33/02; H05B 33/08; H05B 33/0803; H05B 33/0806; H05B 33/0842; H05B 33/0851; H04N 9/312; H04N 9/3155

See application file for complete search history.

(56) References Cited

U.S. PATENT DOCUMENTS

| | | | |
|---|---|---|---|
| 7,439,945 B1* | 10/2008 | Awalt | H05B 33/0818 315/250 |
| 8,299,724 B2* | 10/2012 | Huynh | H05B 33/083 315/291 |
| 9,554,435 B2 | 1/2017 | Farris et al. | |
| 2006/0038803 A1* | 2/2006 | Miller | H05B 33/0815 345/204 |
| 2010/0052569 A1* | 3/2010 | Hoogzaad | H05B 33/0818 315/294 |
| 2011/0109249 A1 | 5/2011 | Liu et al. | |
| 2011/0199011 A1* | 8/2011 | Nakazawa | G09G 3/342 315/193 |
| 2012/0194087 A1 | 8/2012 | Yu et al. | |
| 2013/0038227 A1 | 2/2013 | Yan et al. | |
| 2013/0119881 A1 | 5/2013 | Fang et al. | |
| 2014/0021879 A1 | 1/2014 | Yu et al. | |
| 2014/0085731 A1 | 3/2014 | Farris et al. | |
| 2014/0091724 A1* | 4/2014 | Palmer | H02M 3/1582 315/201 |
| 2014/0211192 A1* | 7/2014 | Grootjans | H05B 33/0818 356/5.01 |

(Continued)

*Primary Examiner* — Jason Crawford
(74) *Attorney, Agent, or Firm* — Michael A. Davis, Jr.; Charles A. Brill; Frank D. Cimino

(57) ABSTRACT

In described examples, a circuit for controlling a light emitting diode (LED) includes a switch control circuit to generate a first control signal for a first switch coupled in parallel with the LED. The switch control circuit generates the first control signal responsive to a magnitude of loop current through the first switch relative to a first reference signal. A switch driver generates a second control signal for a second switch coupled to the first switch via an inductor. The first switch driver generates the second control signal responsive to the magnitude of the loop current through the first switch relative to the first reference signal.

18 Claims, 3 Drawing Sheets

(56) References Cited

U.S. PATENT DOCUMENTS

| | | | |
|---|---|---|---|
| 2015/0163877 A1* | 6/2015 | Bordin | H05B 33/0815 |
| | | | 315/186 |
| 2015/0189711 A1* | 7/2015 | Horsky | H05B 33/083 |
| | | | 315/186 |
| 2016/0021715 A1* | 1/2016 | Wu | H05B 33/0851 |
| | | | 315/200 R |
| 2016/0150608 A1 | 5/2016 | Kuang et al. | |
| 2017/0325300 A1* | 11/2017 | Drake | H05B 33/089 |

\* cited by examiner

LED DRIVER

CROSS REFERENCE TO RELATED CASE(S)

This case contains subject matter that may be related to a copending application entitled "LED DRIVER" having Ser. No. 15/859,110.

BACKGROUND

Light emitting diodes (LEDs) are used for a variety of purposes. An LED driver is an electrical circuit that provides a current to an LED to cause the LED to produce light. For some applications, the LED is controlled to produce light at varying amplitudes, and the LED driver attempts to produce an appropriate magnitude of current to the LED to thereby produce the desired light intensity.

SUMMARY

In one example, a circuit for controlling a light emitting diode (LED) includes a switch control circuit to generate a first control signal for a first switch coupled in parallel with the LED responsive to a magnitude of loop current through the first switch relative to a first reference signal. A switch driver is to generate a second control signal for a second switch coupled to the first switch via an inductor responsive to the magnitude of the loop current through the first switch relative to the first reference signal.

In another example, a circuit for controlling an LED includes a switch control circuit to generate a control signal for a first switch coupled in parallel with the LED responsive to a magnitude of current through the first switch relative to a first reference signal. A first comparator includes first and second inputs and an output. The first input is to be coupled to a photo-sensitive device. The output is coupled to provide a first output signal configured to control a second switch coupled through an inductor to the first switch. A second comparator is coupled to a sense resistor and is to generate a second output signal indicative of the magnitude of current through the first switch relative to the reference signal.

In yet another example, apparatus includes a switch control circuit to generate a control signal for a switch coupled in parallel with the LED. The switch control circuit is coupled to generate the control signal responsive to a magnitude of loop current through the switch relative to a reference signal. A comparator is to compare the reference signal to signal indicative of current through the switch and to provide an output signal to the switch control circuit.

BRIEF DESCRIPTION OF THE DRAWINGS

For a detailed description of various examples, reference will now be made to the accompanying drawings in which.

DETAILED DESCRIPTION

The examples disclosed herein are directed to LED drivers that control a pair of switches coupled to an LED. The LED may be used as a light source for a digital micromirror device (DMD), but can be used in other applications as well. The term "LED" includes semiconductor light sources (e.g., PN junctions), laser diodes, etc. The control of the switches are synchronized such that when current is caused to flow through the LED to create light, the current is at a consistent level each time the LED is turned on. As a result, the light produced by the LED has an intensity that is consistent each time the LED is activated thereby avoiding, or at least reducing, flicker in the light produced by the LED.

In one application, the DMD is used as an imaging producing source for a heads-up display (HUD) in an automobile. A DMD comprises an array of individually actuatable mirrors to reflect light from an LED either on to an image receiving surface such as the inside of the automobile's windshield or elsewhere (e.g., a heat sink). A single LED may be included to shine light on the mirrors of the DMD, or multiple LEDs (e.g., red, green, and blue LEDs) may be used if a color is desired. As a HUD for an automobile, the ability to vary the intensity of the light from the LED is helpful because the automobile is operated in a variety of different lighting conditions. For example, the LED should be operated at brighter light levels during the day than at night.

In some implementations, the LED for the DMD is operated in a continuous mode for higher average current levels (and thus for greater light intensity), whereas the LED is operated in a discontinuous mode for lower average current levels (and thus for lower light intensity). During the continuous mode of operation, the LED is on continuously to generate light, but during the discontinuous mode of operation, switches controlling the LED are pulsed on and off. The embodiments described herein improve discontinuous mode of operation for LED drivers to achieve lower light intensity levels while avoiding flicker.

Figure 1:
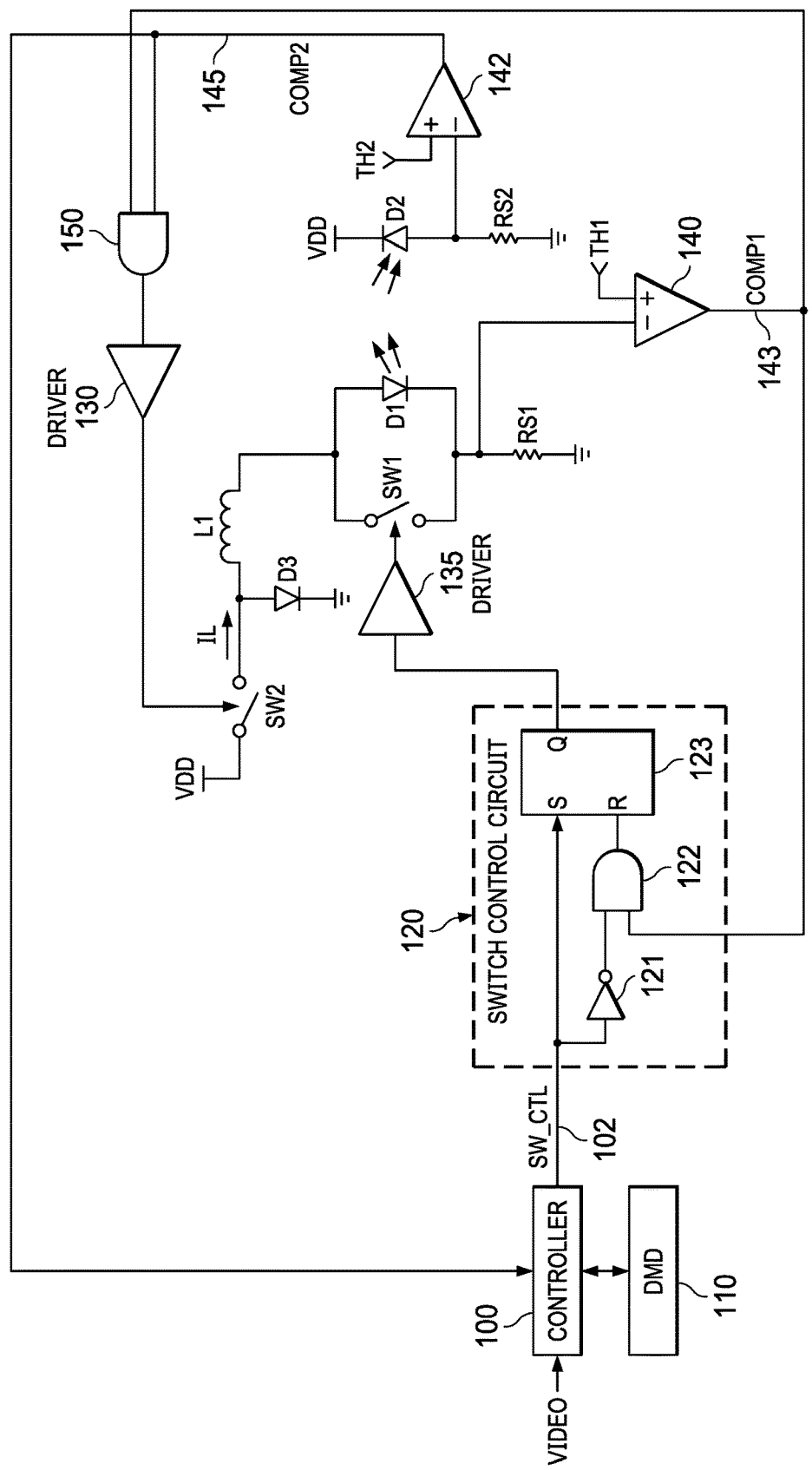
FIG. 1 illustrates an example of a circuit that controls a light emitting diode (LED)

FIG. 1 shows an example of a circuit for driving an LED for use with a DMD. The example of FIG. 1 includes a controller 100, a DMD 110, a switch control circuit 120, an LED D1, a photosensor D2, a flyback diode D3, sense resistors RS1 and RS2, comparators 140 and 142, switches SW1 and SW2, switch drivers 130 and 135, and logic gate 150. The controller 100 receives a video signal which is then processed to transmit signals to the DMD 110 to control the tilt state of the individual mirrors to thereby create an image. The LED D1 shines light on the mirrors of the DMD. A current loop is formed from switch SW2, inductor L1, and the parallel combination of switch SW1 and LED D1. That is, SW1 is connected in parallel with LED D1 and the combination of SW1/D1 is connected in series with inductor L1 and switch SW2. Switch SW2 is coupled to a voltage source node (VDD). Current flows along any of multiple current paths as dictated by the state of the switches SW1 and SW2. If SW1 and SW2 are closed, current flows from VDD through SW2, through inductor L1 and through SW1 to sense resistor RS1. If SW2 is closed and SW1 is open, then current flows from VDD, through SW2, through inductor L1 and through LED D1 to sense resistor RS1. Inductor L1 can store energy. As such, if SW2 is opened, inductor L1 provides a source of current which flows from inductor L1 through either SW1 (if SW1 is closed) or through LED D1 (if SW1 is open) to ground and back to inductor L1 through the flyback diode D3. As the energy in inductor L1 is of a limited amount, the loop current IL through the current loop (that is, the current through SW2 and/or the inductor L1) decreases. Again closing SW2 causes the loop current IL to increase. With current flowing through the current loop, LED D1 is activated to produce light by opening SW1 and deactivated to cease producing light by closing SW1.

References are made herein to opening and closing switches SW1 and SW2. The switches SW1 and SW2 are implemented as solid-state transistors and thus closing a switch means turning the transistor on. Opening a switch means turning the transistor off. SW1 and SW2 may be implemented as metal oxide semiconductor field effector transistor (MOSFET) devices, bipolar junction transistor (BJT) devices, or other types of transistor devices.

Switch SW2 is controlled by the output of logic gate 150, although in some examples logic gate 150 is omitted and the switch driver 130 is controlled directly by the COMP2 output signal 144 from comparator 142. Logic gate 150 may include an AND gate as shown in the example of FIG. 1, but can comprise other types of logic gates in other examples. Switch driver 130 is coupled to the output of logic gate 150. Switch driver 130 produces a sufficient voltage to control the state of SW2. One input to logic gate 150 includes the output signal 143 from comparator 140 (which indicates whether the loop current IL is greater or less than a threshold as explained below). The other input to logic gate 150 is coupled to an output of comparator 142. Photosensor D2 may be implemented as a photodiode or other suitable type of photo-sensitive device. Photosensor D2 is coupled to a voltage supply VDD and to sense resistor RS2. Photosensor D2 generates a current that is proportional to the amount of light it detects, which includes light generated by the LED D1. The voltage produced across the sense resistor RS2 (which is a relatively low resistance device) is a function of the current from the photosensor D2 and thus a function of the intensity of light detected by the photosensor D2.

The comparator 142 compares the signal from the photosensor D2 to a reference signal TH2 (e.g., a reference voltage). The output 145 of the comparator (COMP2) is provided to logic gate 150 and to controller 100. The output of the logic gate 150 is a logic high responsive to both (a) the intensity of the detected light being below a threshold set by the reference signal TH2 and (b) the magnitude of the loop current IL being less than a threshold set by the reference signal TH1.

Figure 2:
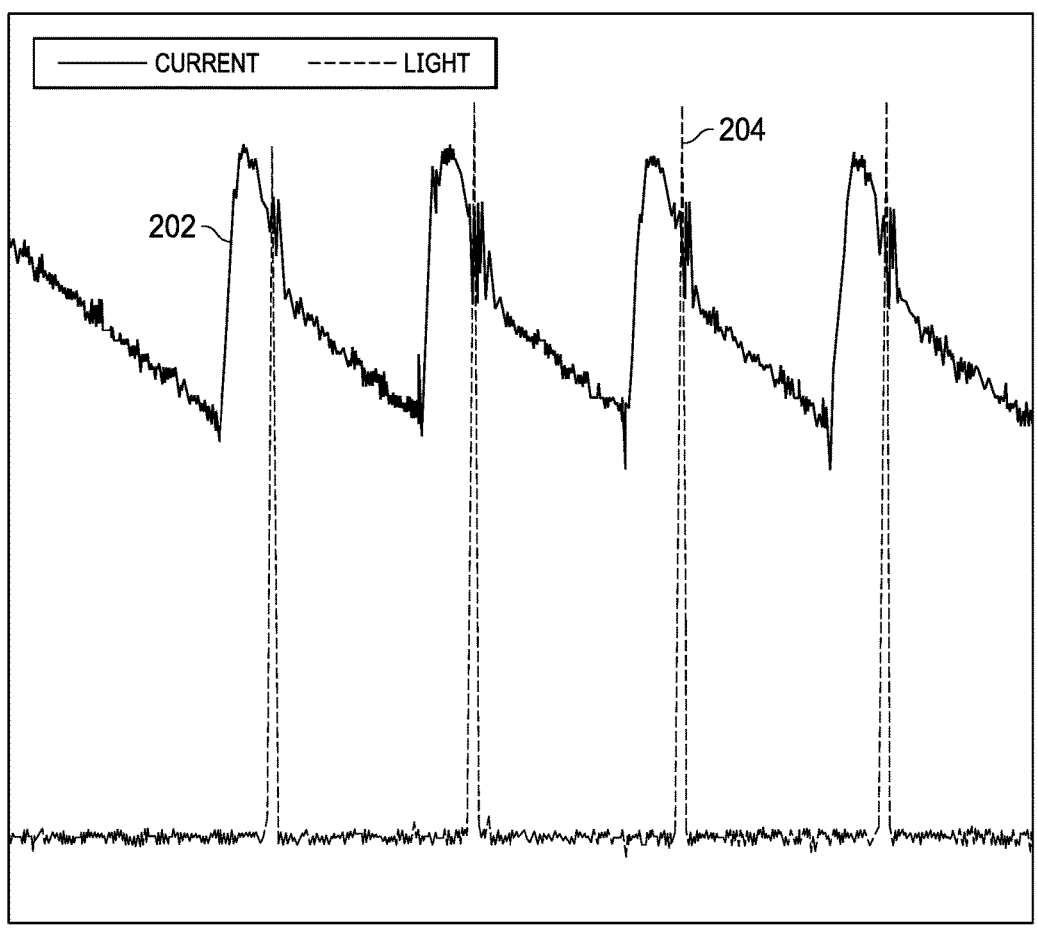
FIG. 2 illustrates an example of current and light waveforms for the example of FIG. 1.

When either the intensity of the detected light is greater than the threshold set by the reference signal TH2 or the magnitude of the loop current is greater than the threshold set by the reference signal TH1, the output of logic gate 150 will become a logic low which causes SW2 to open. With SW2 off, the inductor L1 produces the loop current. Thus, SW2 is turned on and off in a control manner to maintain the loop current IL at a relatively stable level as shown in the example of FIG. 2, described below.

The controller 100 in the example of FIG. 1 generates a switch control signal 102 (labeled as SW_CTL) for SW1. Switch control signal 102 from the controller 100 is indicative of an intention to have SW1 open or close and thus to have current flow to LED D1 to produce light for the DMD 110 or to have current flow through SW1 thereby bypassing LED D1 to prevent the LED D1 from producing light.

The switch control circuit 120 in this example includes an inverter 121, an AND gate 122 (or other type of logic gate), and an SR flip flop 123. The switch control circuit 120 can be implemented with different circuit architectures from that shown in FIG. 1. The "S" input of SR flip flop 123 is coupled to the switch control signal 102. In one example, switch control signal 102 is asserted to a logic high (e.g., 1) to have switch SW1 close. When the S input is a logic high (and the R input is logic low (0)), the output (Q) of the SR flip flop 123 is a logic high. The output of the SR flip flop 123 is provided to switch driver 135 which produces a sufficient voltage to control the state of SW1. With the Q output of the SR flip flop 123 at a logic high, switch SW1 is caused to close thereby causing any loop current IL to flow through SW1 and bypassing the LED D1. The LED D1 will be off in this state.

The inverter 121 inverts the switch control signal 102. The output of inverter 121 is coupled to an input of AND gate 122. The other input of AND gate 122 is coupled to the output of comparator 140. Comparator 140 compares the voltage across sense resistor RS1 to a reference signal (TH1, for example, a reference voltage). The sense resistor RS1 is a relatively low resistance resistive device that generates a voltage across its terminals that is a function of the loop current IL. By comparing the voltage across sense resistor RS1 to TH1, the comparator 140 determines whether the loop current is greater or less than a reference current level.

With SW2 off and the inductor L1 is the current source, as the loop current IL begins to fall the loop current (as measured by the voltage across RS1) eventually reaches the threshold set by TH1. At that point, the output signal 143 of the comparator 140 (COMP1) changes from a logic low to a logic high. At this point, both inputs of AND gate 122 are high and the R input of the SR flip flop 123 becomes high. The S input is low due to switch control signal 102 being low. The Q output of the SR flip flop 123 becomes a logic low, which through switch driver 135 turns off SW1. At that point, any loop current will flow through the LED D1 thereby turning on the LED and producing light.

Further, because opening SW1 is synchronized to the point at which the loop current reaches a predetermined threshold (TH1), the current through LED D1 will consistently be approximately the same every time the LED D1 is turned on. FIG. 2 illustrates an example of a timing diagram illustrating that the LED D1 has a consistent light intensity level every time it turns on during the discontinuous mode of operation. Curve 202 represents the loop current IL and curve 204 represents the intensity of the light. As can be seen from FIG. 2, the LED turns on at approximately the same point in the current curve and thus the light intensity is relatively consistent each time the LED D1 turns on.

After the LED D1 has been turned on, the controller 100 responds to a logic low on the output signal 145 from comparator 142 (indicative of the intensity of the light being below the reference signal TH2) by asserting the switch control signal 102 back to a logic high. With the switch control signal 102 being a logic high, the S input to the SR flip flop 123 is a logic high and the R input is a logic low. This state of the inputs to the SR flip flop 123 causes the Q output to become a logic high, which through switch driver 135 causes switch SW1 to close and thus LED D1 to turn off.

Figure 3:
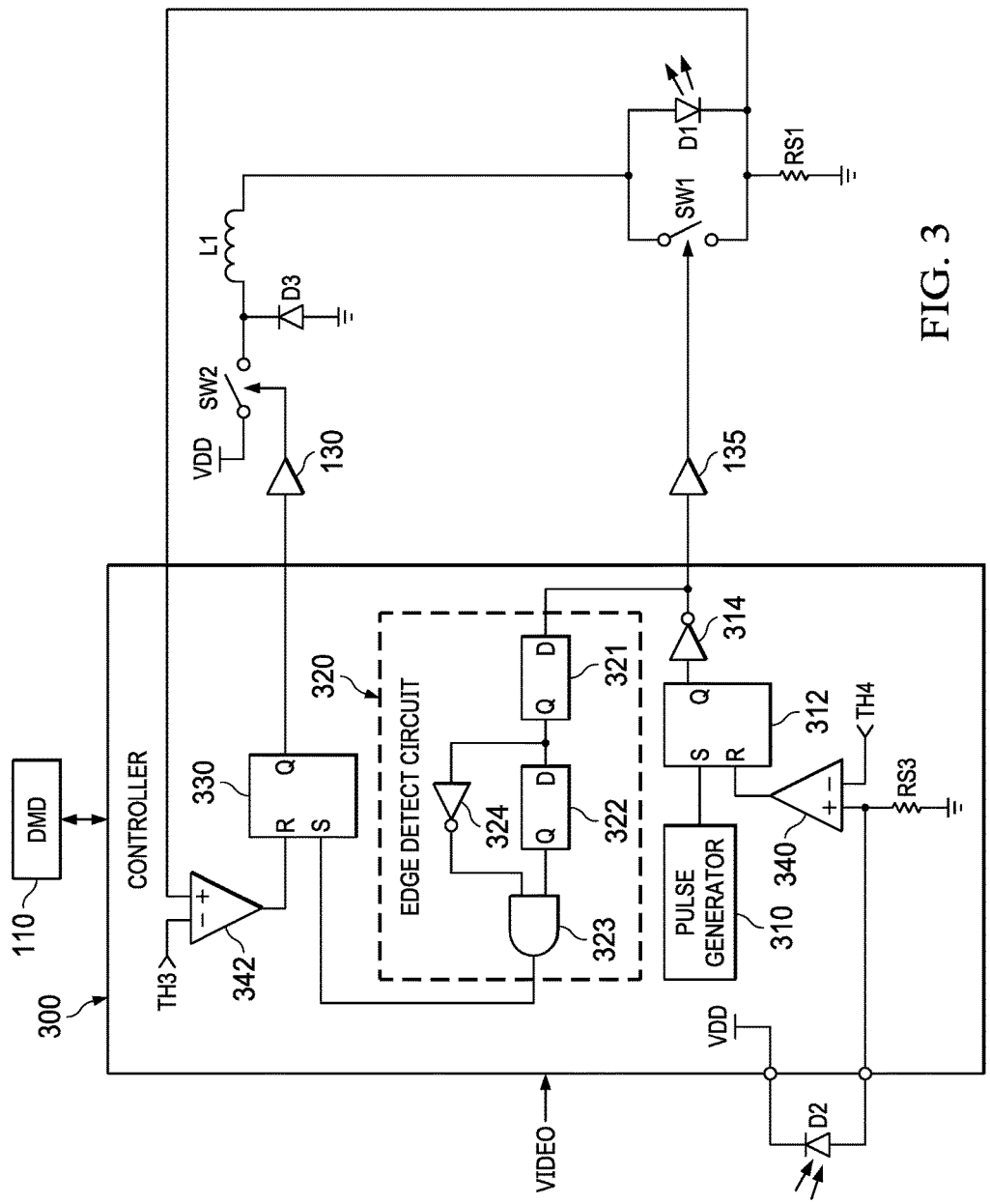
FIG. 3 illustrates another example of a circuit that controls an LED.

FIG. 3 shows another example of a circuit for controlling LED D1. The example of FIG. 3 includes a controller 300, DMD 110, LED D1, a photosensor D2, a flyback diode D3, sense resistor RS1, switches SW1 and SW2, and switch drivers 130 and 135. As for the example of FIG. 1, the controller 300 receives a video signal which is then processed to transmit signals to the DMD 110 to control the tilt state of the individual mirrors to create an image. A similar current loop is included in the circuit of FIG. 3 including switch SW2, inductor L1, and the parallel combination of switch SW1 and LED D1.

The controller 300 of FIG. 3 includes a pulse generator 310, SR flip flops 312 and 330, an inverter 314, an edge detect circuit 320, comparators 340 and 342, and sense resistor RS3. A trans-impedance amplifier can be used instead of a sense resistor. The controller 300 can be fabricated as a part that includes the components shown in FIG. 3. In other examples, the controller 300 includes some, but not all, of the components shown in FIG. 3. For example, the sense resistor RS3 may be provided separate from controller 300.

The pulse generator 310 is coupled to the S input of SR flip flop 312 and the Q output of the SR flip flop 312 is coupled to an input of inverter 314. The output from comparator 340 is coupled to the R input of SR flip flop 312. Similar to the configuration and operation of comparator 142 in FIG. 1, the comparator 340 compares a signal derived from the photosensor D2 (the voltage across sense resistor RS3) to a reference signal TH4 to produce an output signal to the SR flip flop 312 that is indicative of whether the detected light signal is greater or smaller than TH4.

The output of inverter 314 is provided to switch driver 135 to thereby turn SW1 on and off as was the case in the example of FIG. 1. The output of inverter 314 also is provide to the edge detect circuit 320. The edge detect circuit 320 in this example includes two D flip flops 321 and 322, AND gate 323 and inverter 324. The output of inverter 314 is provided to the D input of D flip flop 321 and the Q output of D flip flop 321 is provided to the D input flip flop 322. The Q output of D flip flop 322 is provided to one of the inputs of AND gate 323. The input of inverter 324 is coupled to the Q output of D flip flop 321 and the output of inverter 324 is coupled to the other input of AND gate 323.

The output of AND gate 323 is coupled to the S input of SR flip flop 330. The Q output of flip flop 330 coupled to switch driver 130 and is used to control the state of switch SW2. Comparator 342 functions similar to comparator 140 of FIG. 1 by comparing the voltage from sense resistor RS1 to a reference signal TH3 to generate a comparator output signal that is indicative of whether the loop current is greater or smaller than a threshold.

To produce a sequences of light pulses using LED D1, the controller 300 initializes SR flip flops 312 and 330 to a logic low output state (via signaling not explicitly shown). The output of inverter 314 will be a logic high which causes switch SW1 to close thereby preventing LED D1 from being on and generating light. The output of driver 130 will be a logic low which causes switch SW2 to open, preventing any further charging of energy in inductor L1.

The output of the pulse generator 310 becoming a logic high initiates a transition in the state of the controller 300 to turn on the LED D1. The logic high from the pulse generator 310 (with the output of the comparator 340 being a logic low indicating the detected light intensity is below the corresponding threshold), causes the output of the SR flip flop 312 to be a logic high. The inverter 314 responds to a logic high on its input by producing a logic low on its output, which in turn turns off SW1 thereby causing loop current to flow to LED D1 to produce light.

The output of inverter 314 is provide to the edge detect circuit 320. The edge detect circuit 320 generates an output signal from AND gate 323 that is asserted high responsive to detection of a logic high to logic low transition on the output of the inverter 314 (indicative of a state in which the LED D1 should be turned on). The edge detect circuit works as follows. D flip flop 322 stores the past state of the output of inverter 314, while D flip flop 321 stores the current state of inverter 314, at any particular instant. As the Q output of D flip flop 321 is inverted before connecting to AND gate 323, the AND gate will output a logic high whenever the past state of inverter 314 is high and the current state of inverter 314 is low. Therefore, the edge detect circuit 320 outputs a momentary pulse upon a falling edge of inverter 314.

The out of the AND gate 323 thus becomes high. The output of AND gate 323 is provided to the S input of the SR flip flop 330, which causes the output of the SR flip flop 330 to become a logic high. A logic high on the output of the SR flip flop 330 causes the switch driver 130 to generate a voltage to switch SW2 at a sufficient voltage level to turn on SW2. Once SW2 closes (and as SW1 is open as explained above), current begins to flow from VDD through SW2, L1 and to LED D1 to thereby turn on LED D1. As such, LED D1 in this example circuit is consistently caused to be turned on with a similar loop current magnitude.

If the loop current level becomes greater than a threshold set by reference signal TH3, the output of comparator 342 becomes a logic high. The R input of SR flip flop 330 is then asserted high which (with the S input being low) causes the output from SR flip flop to be a logic low thereby turning off SW2. Eventually, the loop current falls to zero and the process repeats.

If the light intensity detected by the photosensor D2 becomes greater than a threshold set by reference signal TH4, the output of comparator 340 becomes high. With the output of comparator 340 being, the output of SR flip flop 312 is forced low, which through inverter 314 causes SW1 to be closed thereby turning of LED D1.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A circuit, comprising:
   a switch control circuit having a switch control output, a switch control input and a loop control input, the switch control output adapted to be coupled to a control node of a first switch in parallel with a light emitting diode (LED), the loop control input adapted to be coupled to an output node of the first switch, and the switch control circuit configured to: responsive to a signal at the switch control input, generate a first control signal at the switch control output based on whether a current through the first switch is above a threshold;
   a switch driver having a driver output and a driver input, the driver output adapted to be coupled to a control node of a second switch in series with an inductor and the first switch, the driver input adapted to be coupled to the output node of the first switch, and the switch driver configured to generate a second control signal at the driver output based on whether the current through the first switch is above the threshold; and
   a comparator having a comparator output and first and second comparator inputs, the comparator output adapted to be coupled to the switch control input, the first comparator input adapted to be coupled to a photosensitive device, the second comparator input adapted to be coupled to a reference node, and the comparator configured to generate a signal at the comparator output based on a magnitude of a signal at the first comparator input relative to a magnitude of a signal at the second comparator input, the signal at the first comparator input being indicative of light detected by the photosensitive device.

2. The circuit of claim 1, further comprising a logic gate having a first input coupled to the comparator output, a second input adapted to be coupled to the output node of the first switch, and an output coupled to the driver input.

3. The circuit for controlling the LED of claim 1, wherein the comparator is a first comparator, the comparator output is a first comparator output, the reference node is a first reference node, and the circuit further comprises a second comparator having a second comparator output and third and fourth comparator inputs, the second comparator output coupled to the loop control input, the third comparator input adapted to be coupled to the output node of the first switch, the fourth comparator input adapted to be coupled to a second reference node, the second comparator configured to generate a signal at the second comparator output based on whether the current through the first switch is above the threshold, the current through the first switch being indicated by a signal at the third comparator input, and the threshold being indicated by a signal at the fourth comparator input.

4. The circuit of claim 1, wherein the switch control circuit includes a flip flop.

5. A circuit for controlling a light emitting diode (LED), comprising:
a switch control circuit configured to generate a control signal for a first switch coupled in parallel with the LED, responsive to whether a magnitude of current through the first switch is above a threshold;
a first comparator having first and second inputs and a first output, the first input coupled to a photosensitive device, the second input coupled to a first reference node, and the first comparator configured to generate a first output signal at the first output to control a second switch coupled through an inductor to the first switch; and
a second comparator having third and fourth inputs and a second output, the third input coupled to a sense resistor and to an output node of the first switch, the fourth input coupled to a second reference node, and the second comparator configured to generate a second output signal at the second output indicative of whether the magnitude of current through the first switch is above the threshold.

6. The circuit of claim 5, wherein the second switch has a control node, and the circuit further comprises a logic gate having a first logic gate input coupled to the first output, a second logic gate input coupled to the second output, and a logic gate output coupled to the control node.

7. The circuit of claim 5, wherein the switch control circuit includes a flip flop having a flip flop output and first and second control inputs, the flip flop output adapted to be coupled to the first switch, and the first control input coupled to the first output.

8. The circuit of claim 7, wherein the switch control circuit further includes an inverter having an inverter input and an inverter output, the inverter input coupled to the first control input.

9. The circuit of claim 8, wherein the switch control circuit further includes a logic gate having a logic gate output and first and second logic gate inputs, the first logic gate input coupled to the inverter output, and the second logic gate input coupled to the second output.

10. The circuit of claim 9, wherein the logic gate output is coupled to the second control input.

11. The circuit of claim 5, wherein the switch control circuit is configured to generate the control signal responsive to the magnitude of current through the first switch falling below the threshold.

12. Apparatus, comprising:
a switch control circuit configured to generate a control signal for a switch coupled in parallel with an LED, the switch control circuit configured to generate the control signal responsive to whether a magnitude of current through the switch is above a threshold;
a first comparator configured to: compare a first reference signal to a signal indicative of current through the switch; and responsive to that comparison, generate a first output signal to the switch control circuit; and
a second comparator configured to: compare a second reference signal to a signal indicative of intensity of light detected by a photosensitive device; and responsive to that comparison, generate a second output signal to the switch control circuit.

13. The apparatus of claim 12, wherein the switch is a first switch, and the apparatus further comprises a logic gate configured to: responsive to the first and second output signals, control a second switch coupled to the first switch via an inductor.

14. A circuit, comprising:
a switch control circuit including a flip flop, an inverter and a logic gate, the flip flop having a switch control output, a switch control input and a loop control input, the switch control output adapted to be coupled to a control node of a first switch in parallel with a light emitting diode (LED), the logic gate having a logic gate output and first and second logic gate inputs, the inverter coupled between the switch control input and the first logic gate input, the second logic gate input coupled to an output node of the first switch, the logic gate output coupled to the loop control input, and the switch control circuit configured to: responsive to a signal at the switch control input, generate a first control signal at the switch control output based on whether a current through the first switch is above a threshold;
a switch driver having a driver output and a driver input, the driver output adapted to be coupled to a control node of a second switch in series with an inductor and the first switch, the driver input adapted to be coupled to the output node of the first switch, and the switch driver configured to generate a second control signal at the driver output based on whether the current through the first switch is above the threshold; and
a comparator having a comparator output and first and second comparator inputs, the comparator output adapted to be coupled to the switch control input, the first comparator input adapted to be coupled to a photosensitive device, the second comparator input adapted to be coupled to a reference node, and the comparator configured to generate a signal at the comparator output based on a magnitude of a signal at the first comparator input relative to a magnitude of a signal at the second comparator input, the signal at the first comparator input being indicative of light detected by the photosensitive device.

15. The circuit of claim 14, further comprising a logic gate having a first input coupled to the comparator output, a second input adapted to be coupled to the output node of the first switch, and an output coupled to the driver input.

16. The circuit of claim 14, wherein the comparator is a first comparator, the comparator output is a first comparator output, the reference node is a first reference node, and the circuit further comprises a second comparator having a second comparator output and third and fourth comparator inputs, the second comparator output coupled to the loop control input, the third comparator input adapted to be coupled to the output node of the first switch, the fourth comparator input adapted to be coupled to a second reference node, the second comparator configured to generate a signal at the second comparator output based on whether the current through the first switch is above the threshold, the current through the first switch being indicated by a signal at the third comparator input, and the threshold being indicated by a signal at the fourth comparator input.

17. The circuit of claim 14, wherein the flip flop is an SR flip flop.

18. The circuit of claim 14, wherein the switch control circuit is configured to generate the first control signal responsive to the current through the first switch being below the threshold.

* * * * *